(12) United States Patent
Blackburn et al.

(10) Patent No.: US 10,294,928 B2
(45) Date of Patent: May 21, 2019

(54) SMA BUNDLE WIRE OPTIMISATION IN AN ENERGY RECOVERY DEVICE

(71) Applicant: EXERGYN LIMITED, Dublin (IE)

(72) Inventors: Richard Blackburn, Dublin (IE); Barry Cullen, Dublin (IE); Kevin O'Toole, Dublin (IE)

(73) Assignee: Exergyn Limited, Dublin (IE)

( * ) Notice: Subject to any disclaimer, the term of this patent is extended or adjusted under 35 U.S.C. 154(b) by 0 days.

(21) Appl. No.: 15/741,049

(22) PCT Filed: Jun. 30, 2016

(86) PCT No.: PCT/EP2016/065310
§ 371 (c)(1),
(2) Date: Dec. 29, 2017

(87) PCT Pub. No.: WO2017/001562
PCT Pub. Date: Jan. 5, 2017

(65) Prior Publication Data
US 2018/0187659 A1    Jul. 5, 2018

(30) Foreign Application Priority Data
Jun. 30, 2015   (GB) .................................. 1511466.3

(51) Int. Cl.
*F03G 7/06*        (2006.01)
*F02G 5/00*        (2006.01)

(52) U.S. Cl.
CPC ............... *F03G 7/065* (2013.01); *F02G 5/00* (2013.01); *F03G 7/06* (2013.01); *F05C 2251/08* (2013.01)

(58) Field of Classification Search
CPC ... F03G 7/06; F03G 7/065; F02G 5/00; F05C 2251/08
See application file for complete search history.

(56) References Cited

U.S. PATENT DOCUMENTS

| 4,041,706 A | * | 8/1977 | White ...................... F03G 7/06 60/527 |
| 4,231,223 A | * | 11/1980 | Pringle ................... F03G 7/065 60/527 |
| 4,306,415 A | | 12/1981 | Hochstein et al. |
| 4,553,393 A | * | 11/1985 | Ruoff ....................... F16F 3/04 337/140 |
| 4,759,187 A | * | 7/1988 | O'Hare ..................... F03G 6/00 60/527 |
| 8,695,334 B2 | | 4/2014 | Lewis et al. |
| 8,857,174 B2 | | 10/2014 | Alexander et al. |

(Continued)

FOREIGN PATENT DOCUMENTS

| DE | 102012202396 | 8/2012 | |
| EP | 1130257 | 9/2002 | |
| JP | 60219476 A | * 11/1985 | ............. F03G 7/065 |

*Primary Examiner* — Mark A Laurenzi
*Assistant Examiner* — Xiaoting Hu
(74) *Attorney, Agent, or Firm* — Occhiuti & Rohlicek LLP

(57) ABSTRACT

The invention provides an energy recovery device comprising a plurality of Shape Memory Alloy (SMAs) or Negative Thermal Expansion (NTE) elements arranged as a plurality of wires positioned substantially parallel with each other to define a core wherein the wires are selected to have different dimensions such that the plurality of wires are activated at substantially the same time in response to a temperature change.

9 Claims, 3 Drawing Sheets

(56) References Cited

U.S. PATENT DOCUMENTS

| | | | |
|---|---|---|---|
| 2012/0017583 A1* | 1/2012 | Lewis | E21B 33/064 60/529 |
| 2013/0014501 A1* | 1/2013 | Brammajyosula | F03G 7/06 60/527 |
| 2013/0239565 A1* | 9/2013 | Browne | F03G 7/065 60/527 |
| 2017/0198682 A1* | 7/2017 | Cullen | F03G 7/065 |

* cited by examiner

SMA BUNDLE WIRE OPTIMISATION IN AN ENERGY RECOVERY DEVICE

CROSS REFERENCE TO RELATED APPLICATIONS

This application is a National Phase under 35 USC 371 of International Application No. PCT/EP2016/065310 filed on Jun. 30, 2016, which claims priority to United Kingdom Application No. 1511466.3 filed Jun. 30, 2015, the contents of which are hereby incorporated by reference in their entirety.

FIELD

The present application relates to the field of energy recovery and in particular to the use of Shape-memory Alloys (SMA) or Negative Thermal Expansion materials (NTE) for same.

BACKGROUND

Low grade heat, which is typically considered less than 100 degrees, represents a significant waste energy stream in industrial processes, power generation and transport applications. Recovery and re-use of such waste streams is desirable. An example of a technology which has been proposed for this purpose is a Thermoelectric Generator (TEG). Unfortunately, TEGs are relatively expensive. Another largely experimental approach that has been proposed to recover such energy is the use of Shape-memory Alloys.

A Shape-memory Alloy (SMA) is an alloy that "remembers" its original, cold-forged shape which once deformed returns to its pre-deformed shape upon heating. This material is a lightweight, solid-state alternative to conventional actuators such as hydraulic, pneumatic, and motor-based systems.

The three main types of Shape-memory Alloys are the copper-zinc-aluminium-nickel, copper-aluminium-nickel, and nickel-titanium (NiTi) alloys but SMAs can also be created, for example, by alloying zinc, copper, gold and iron.

The memory of such materials has been employed or proposed since the early 1970's for use in heat recovery processes and in particular by constructing SMA engines which recover energy from heat as motion. Recent publications relating to energy recovery devices include PCT Patent Publication number WO2013/087490, assigned to the assignee of the present invention. It is desirable to translate the contraction of the SMA or NTE material into a mechanical force in an efficient manner. It is not a trivial task and generally is complicated and involves significant energy losses.

It is therefore an object to provide an improved system and method in an energy recovery device.

SUMMARY

According to the invention there is provided, as set out in the appended claims, an energy recovery device comprising a plurality of Shape-Memory Alloy (SMAs) or Negative Thermal Expansion (NTE) elements arranged as a plurality of wires positioned substantially parallel with each other to define a core wherein the wires are selected to have different dimensions such that the plurality of wires are activated at substantially the same time in response to a temperature change.

In one embodiment wires positioned towards the centre of the core have a smaller diameter than wires positioned near the outside of the core.

In one embodiment the wire diameters are selected to match the characteristics of a fluid flow at any point in the core and take account of the impact of the flow with other wires and the loss in energy of the flow as it penetrates the bundle, such that an even activation time can be achieved for the plurality of wires.

In one embodiment at least one of the wires is tapered at one end.

In another embodiment there is provided a core for use in an energy recovery device, said core comprising a plurality of wires positioned substantially parallel with each other and wherein the wires are selected to have different dimensions such that the plurality of wires are activated at substantially the same time in response to a temperature change.

In one embodiment activation of at least one wire comprises a transformation from a martensite to an austenite state.

In another embodiment there is provided a method of making an energy recovery device comprising a plurality of Shape-Memory Alloy (SMAs) or Negative Thermal Expansion (NTE) elements arranged as a plurality of wires positioned substantially parallel with each other to define a core comprising the step of selecting a plurality of wires with different dimensions and positioning the plurality of wires so that they are activated at substantially the same time in response to a temperature change.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

The invention relates to a heat recovery system under development which can use either Shape Memory Alloys (SMA) or Negative Thermal Expansion materials (NTE) to generate power from low grade heat.

Figure 1:
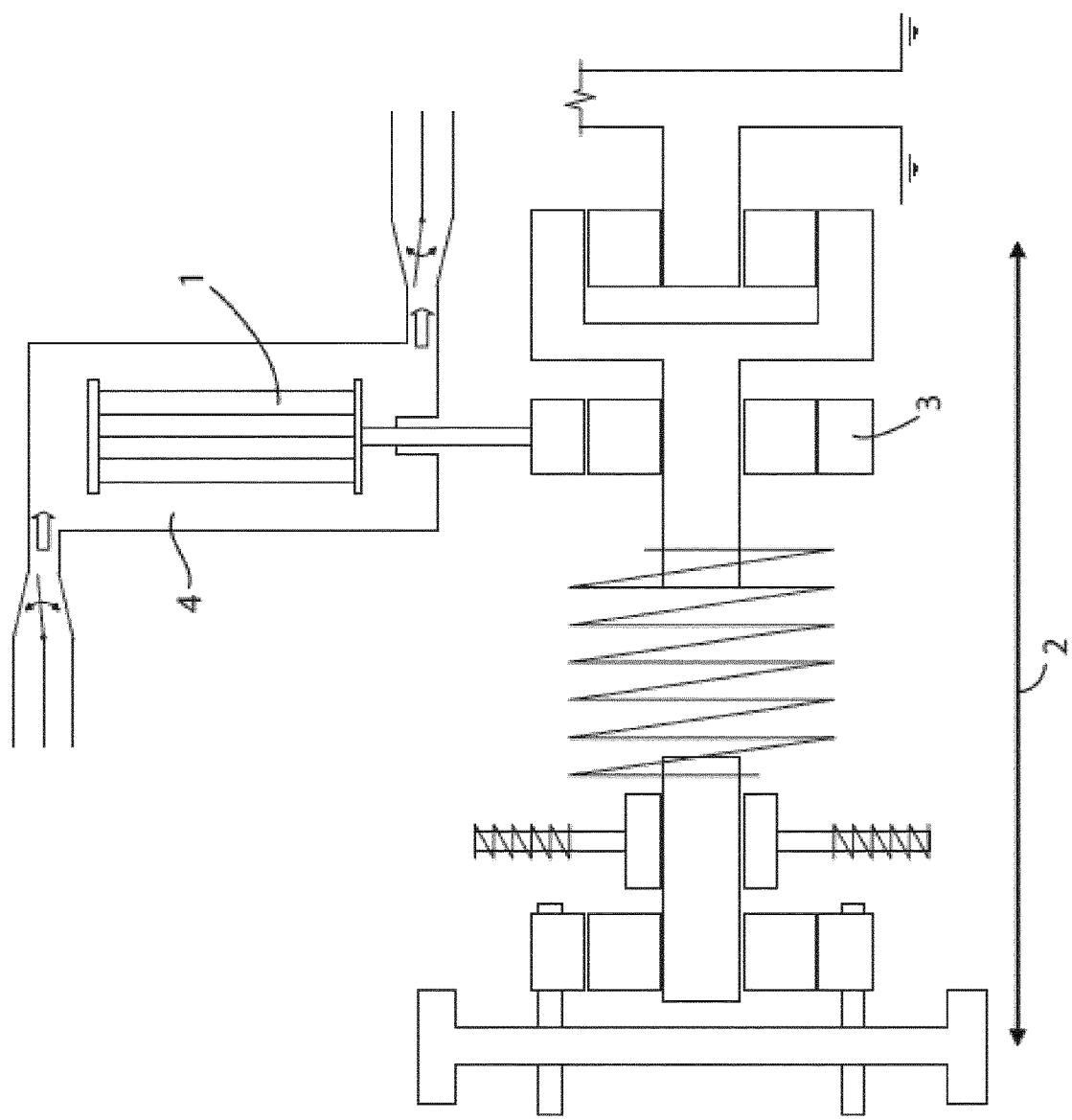
FIG. 1 illustrates a known energy recovery system.

An exemplary known embodiment of an energy recovery device will now be described with reference to FIG. 1 which provides an energy recovery device employing a SMA engine indicated by reference numeral 1. The SMA engine 1 comprises a SMA actuation core. The SMA actuation core is comprised of SMA material clamped or otherwise secured at a first point which is fixed. At the opposing end, the SMA material is clamped or otherwise secured to a drive mechanism 2. Thus whilst the first point is anchored the second point is free to move albeit pulling the drive mechanism 3. An immersion chamber 4 is adapted for housing the SMA engine and is also adapted to be sequentially filled with fluid to allow heating and/or cooling of the SMA engine. Accordingly, as heat is applied to the SMA core it is free to contract. Suitably, the SMA core comprises a plurality of parallel wires, ribbons or sheets of SMA material. It will be appreciated that in the context of the present invention the term 'wire' is used and should be given a broad interpretation to mean any suitable length of SMA or NTE material that can act as a core.

Typically, a deflection in and around 4% is common for such a core. Accordingly, when a 1 m length of SMA material is employed, one might expect a linear movement of approximately 4 cm to be available. It will be appreciated that the resulting force of such movement depends on the mass of wire used. Such an energy recovery device is described in PCT Patent Publication number WO2013/087490, assigned to the assignee of the present invention, and is incorporated fully herein by reference.

For such an application, the contraction of such material on exposure to a heat source is captured and converted to usable mechanical work. A useful material for the working element of such an engine has been proven to be Nickel-Titanium alloy (NiTi). This alloy is a well-known Shape-Memory Alloy and has numerous uses across different industries. It will be appreciated that any suitable SMA or NTE material can be used in the context of the present invention.

Force is generated through the contraction and expansion of this alloy (presented as a plurality of wires) within the working core, via a piston and transmission mechanism. Accordingly, depending on the requirements of a particular configuration and the mass of SMA material needed, a plurality of elongated SMA or NTE wires may be employed together, spaced substantially parallel to each other, to form a single core. Preferably a plurality of Shape Memory Alloy (SMAs) or Negative Thermal Expansion (NTE) elements are arranged as a plurality of elongated wires positioned substantially parallel with each other to define a core or core engine. This is equivalent to the SMA engine 1 described with respect to FIG. 1.

Figure 2:
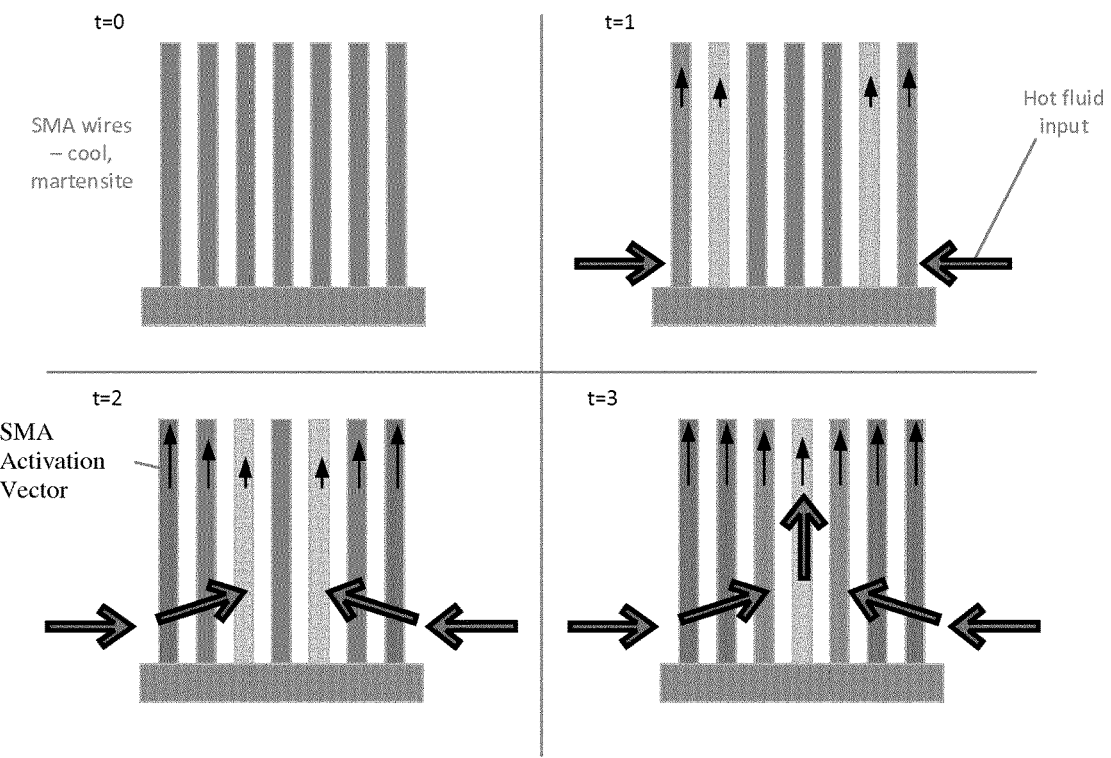
FIG. 2 illustrates a plurality of wires making up a core and uneven wire activation as a result of fluid input dynamics at different temperatures.

A problem with the core having a plurality of wires is the uneven heating of the wires in the core as shown in FIG. 2. In one embodiment the invention addresses an unbalance in stress distribution across the SMA bundle that occurs as a result of the fluid dynamics at the entrance to the SMA core, and as the fluid travels up through the core. As shown at t=0 the SMA wires are in a cool state. Hot fluid enters into the core showing the wires on the outer extremities of the core heating up first while wires positioned towards the centre remain in a cold state at t=1. At t=2 the outer wires have changed state and are activated while wires positioned towards the centre are still in a cool state. Even at t=3 not all of the wires are activated. The net effect of the fluid dynamics is that SMA wires at the exterior of the bundle activate before wires on the interior of the bundle due to a larger convective heat transfer coefficient at the entrance due to turbulent flow (compared to the relatively laminar flow further up the bundle), and the fact that the wires on the exterior of the bundle are impacted earliest. It is an object of the invention to overcome this problem.

First Embodiment

In one embodiment SMA wires of proportionally decreasing diameter towards the centre of a bundle of wires making up the core are used.

Figure 3:
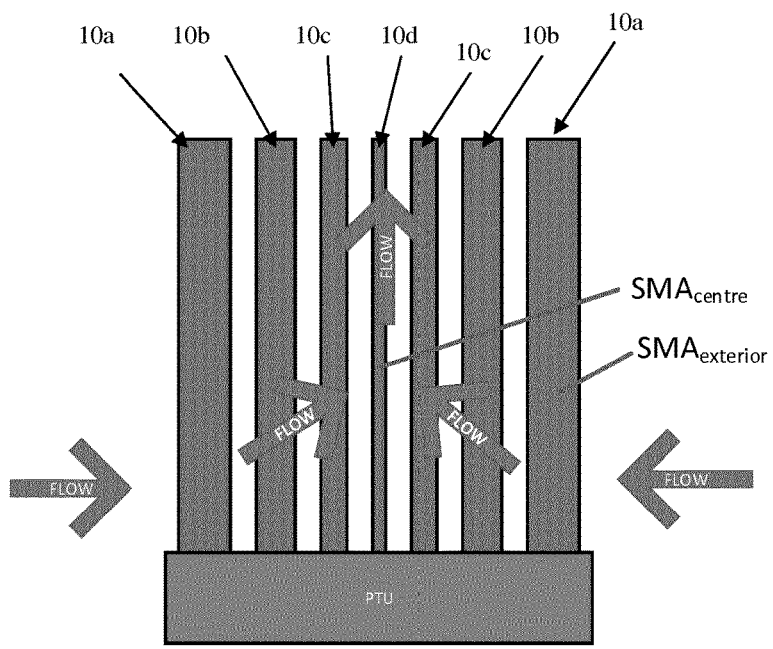
FIG. 3 illustrates a first embodiment of the invention showing core SMA wires decreasing in diameter size towards the centre of a bundle of wires.

FIG. 3 illustrates a first embodiment of the invention showing core SMA wires decreasing in diameter size towards the centre of a bundle of wires 10a, 10b, 10c, 10d, making up the core. As the SMA wires are heated above temperature Austenite start (As), the wires begin their transformation from martensite to austenite. The rate at which the wire heats up is a function of the surface area of the wire to the volume of the wire amongst other factors such as the material characteristics and the transient flow characteristics throughout the bundle.

The surface area to volume ratio decreases with increasing diameter, resulting in a longer heating time to bring the wire to its austenitic state, and hence activate. By selecting the wire diameters of the SMA wires to match the characteristics of the flow at any point in the SMA wire bundle, taking into account the impact of the flow on other wires and the loss in energy of the flow as it penetrates the bundle, an even activation time of all the wires in the core can be achieved. This will result in a more efficient power stroke by achieving a minimisation of any cushioning requirements, and will allow for a more even stress distribution during activation.

The energy recovery system will operate well in SMA cores that have multiple fluid inlet points along the length of the bundle, or have a large gap on the outside of the densely packed SMA bundle for fluid to flow—thereby increasing the heat transfer rate at the exterior of the bundle relative to the centre over the entire length of the SMA bundle.

Second Embodiment

In one embodiment the SMA wires making up a core are dimensioned with a decreasing taper from a fluid inlet to an outlet.

Figure 4:
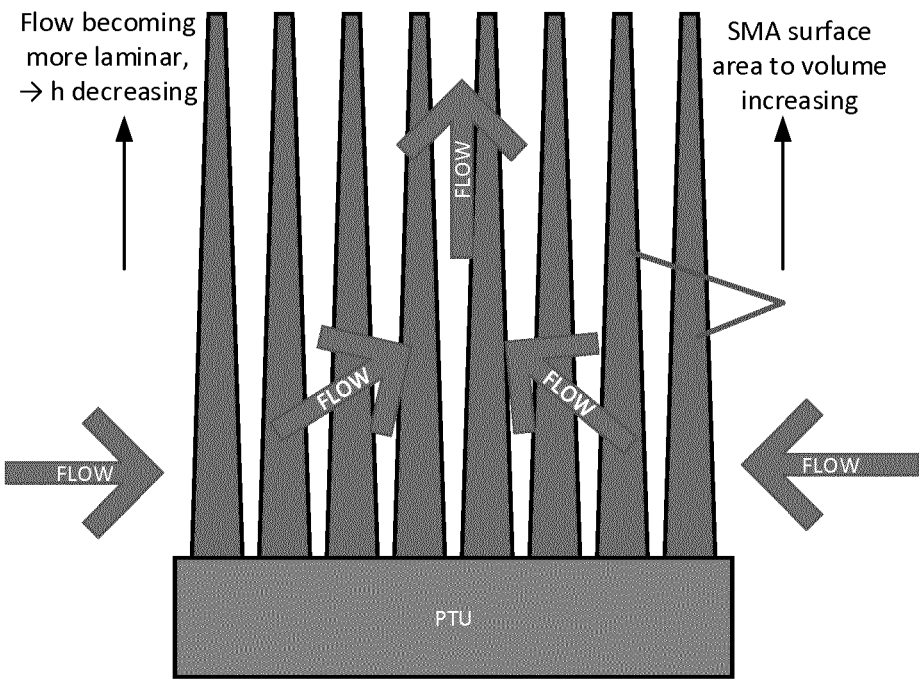
FIG. 4 illustrates a second embodiment of the invention illustrating a plurality of tapered core SMA wires decreasing in diameter width from a fluid inlet to an outlet.

FIG. 4 illustrates a second embodiment of the invention illustrating a plurality of tapered core SMA wires decreasing in size from a fluid inlet to an outlet. This configuration seeks to balance the effect of a varying rate of heat transfer into the wires as a function of the flow characteristics. In one embodiment, at the entrance point to the core the flow is more turbulent when the fluid enters the chamber, interacts substantially perpendicularly with the wires and is directed up through the core in comparison with the more laminar flow as the fluid travels up the core.

The turbulent region will have a larger convection heat transfer coefficient, and thus heating of the wires will occur at a faster rate than it will further up the core in the laminar flow region.

By tapering the wires in accordance with the expected heat transfer characteristics, it is possible to achieve an even activation rate over the length of the core, resulting in a smoother power stroke profile which reduces any corrections that may be necessary in a coupled transmission.

Third Embodiment

In one embodiment tapered and SMA wire diameter variations are used to offset heat transfer effects.

Figure 5:
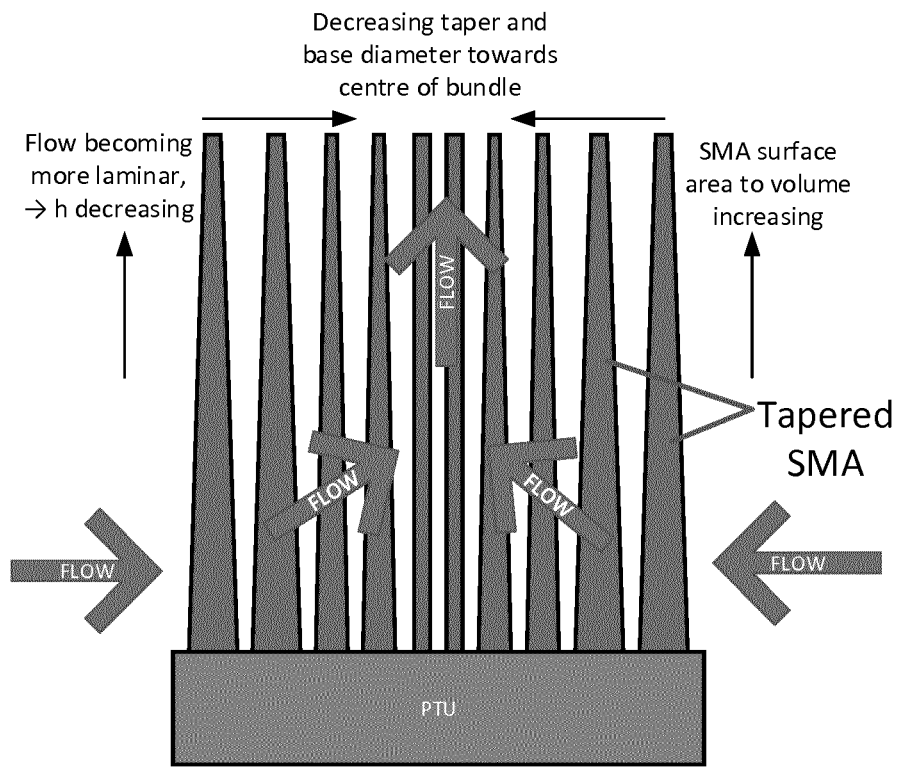
FIG. 5 illustrates a combined tapering and wire diameter reduction in a core described in FIGS. 3 and 4.

FIG. 5 illustrates a combined tapering and wire diameter reduction in a core described in FIGS. 3 and 4. This configuration combines the factors in configuration shown in FIGS. 3 and 4.

The exterior SMA wires display a larger diameter to compensate for the inlet flow characteristics, and the tapered angle decreases towards the centre of the wire bundle or core to balance against the reduction in heat transfer as the fluid interacts with the wires within.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. An energy recovery device comprising a plurality of Shape-Memory Alloy (SMAs) or Negative Thermal Expansion (NTE) elements arranged as a plurality of wires positioned substantially parallel with each other to define a core wherein the wires are selected to have different dimensions and the wires positioned towards the centre of the core have a smaller diameter than wires positioned near the outside of the core such that the plurality of wires are activated at substantially the same time in response to a temperature change.

2. The energy recovery device as claimed in claim 1 wherein the wire diameters are selected to match the characteristics of a fluid flow at any point in the core and take account of the impact of the flow with other wires and the loss in energy of the flow as it penetrates the core to achieve an even activation time for the plurality of wires.

3. The energy recovery device as claimed in claim 2 wherein at least one of the wires is tapered at one end.

4. The energy recovery device as claimed in claim 2 wherein activation of at least one wire comprises a transformation from a martensite to an austenite state.

5. The energy recovery device as claimed in claim 1 wherein at least one of the wires is tapered at one end.

6. The energy recovery device as claimed in claim 5 wherein activation of at least one wire comprises a transformation from a martensite to an austenite state.

7. The energy recovery device as claimed in claim 1 wherein activation of at least one wire comprises a transformation from a martensite to an austenite state.

8. A core for use in an energy recovery device, said core comprising a plurality of Shape-Memory Alloy (SMAs) or Negative Thermal Expansion (NTE) wires positioned substantially parallel with each other and wherein the wires are selected to have different dimensions and the wires positioned towards the centre of the core have a smaller diameter than wires positioned near the outside of the core such that the plurality of wires are activated at substantially the same time in response to a temperature change.

9. A method of making an energy recovery device comprising a plurality of Shape-Memory Alloy (SMAs) or Negative Thermal Expansion (NTE) elements arranged as a plurality of wires positioned substantially parallel with each other to define a core comprising the step of selecting the plurality of wires to have different dimensions and positioning the plurality of wires so that the wires positioned towards the centre of the core have a smaller diameter than wires positioned near the outside of the core such that the plurality of wires are activated at substantially the same time in response to a temperature change.

* * * * *